United States Patent
Brett

(10) Patent No.: US 6,373,529 B1
(45) Date of Patent: Apr. 16, 2002

(54) IMAGE PROCESSING

(75) Inventor: Stephen Brett, Sutton-at-Home (GB)

(73) Assignee: Pandora International Ltd., Northfleet (GB)

( * ) Notice: Subject to any disclaimer, the term of this patent is extended or adjusted under 35 U.S.C. 154(b) by 0 days.

(21) Appl. No.: 09/056,275

(22) Filed: Apr. 7, 1998

(30) Foreign Application Priority Data

Apr. 7, 1997 (GB) ............................................. 9707020

(51) Int. Cl.[7] .................................................. H04N 9/64
(52) U.S. Cl. ....................... 348/571; 348/650; 348/575; 348/576; 348/722; 382/162
(58) Field of Search .................................. 348/571, 576, 348/577, 578, 649, 650, 651, 722, 575, 398.1, 397.1; 382/162, 167, 274; H04N 9/64

(56) References Cited

U.S. PATENT DOCUMENTS

| 5,363,097 A | 11/1994 | Jan ............................. 341/67 |
| 5,450,500 A | 9/1995 | Brett .......................... 382/162 |
| 5,737,032 A | * 4/1998 | Stenzel et al. ............... 348/649 |
| 5,838,299 A | * 11/1998 | Smith et al. ................. 345/137 |
| 6,002,806 A | * 12/1999 | Morikawa .................... 382/274 |

* cited by examiner

Primary Examiner—Reinhard J. Eisenzopf
Assistant Examiner—Jean W. Désir
(74) Attorney, Agent, or Firm—McDonnell Boehnen Hulbert & Berghoff

(57) ABSTRACT

A method and apparatus for the processing of video data in which the appearance characteristics of picture elements are modified using digital apparatus such as a color processor which provides a plurality of channels having respective processing means, each channel being adapted normally to operate to process a discrete range of characteristics, wherein the method comprises the step of operating the apparatus in an alternative mode in which at least two of the channels are used to carry out identical processing steps, spatial segments of the video data being split between said at least two channels to thereby increase the speed of processing.

2 Claims, 1 Drawing Sheet

IMAGE PROCESSING

FIELD OF INVENTION

The present application relates to image processing and in particular to electronic and computer techniques to enhance the editorial effects that can be produced with motion picture images resulting from film or video.

BACKGROUND OF THE INVENTION

Machines to produce electrical signals from motion picture film have been known for many years. References exist showing that such processes were known in the 1920's and used by John Logie Baird. Examples of current machines ('telecine machines') to perform this function include the URSA 'Diamond' machine manufactured by Cintel International Ltd. of Ware, Hertfordshire, and the 'SPIRIT Datacine' from Philips, Darmstadt, Germany.

These systems permit some editorial adjustment to the electrical images produced from the film to be made. These functions usually include the adjustment of gain (white level), lift (black level), and gamma (contrast and midtone). Some telecine machines also contain primary and secondary colour correction systems. Primary colour correction is the adjustment of the primary colour content of the image. For example, all areas containing red may be made redder i.e. the level of red in the whole image may be increased. This will necessarily affect the grey tones which are composed of equal components of red, green, and blue. Secondary colour correction is the adjustment of particular colours in the image and, for example, distinctions may be made between areas containing solely red, and areas containing red in conjunction with other colours, such as grey areas.

It is commonly preferred for telecine users and owners to purchase separate colour correction systems to those included in some telecine machines. An example of such a system is the 'DCP' system manufactured by Pandora International Ltd. Many aspects of this system are disclosed in U.S. Pat. No. 5,450,500, International patent application WO 95/12289, and others.

As is disclosed in U.S. Pat. No. 5,450,500, the DCP system is capable of identifying a particular area of an image and, if required, adjusting the appearance of the image to achieve a desired effect. The area to be adjusted may be identified by one or more criteria including the luminance, hue, saturation, position or texture of one or more of its constituent pixels. The DCP is equipped with eight channels each of which can be configured to perform a separate adjustment on an individually defined area of the image. Each pixel in the stream of digital video data from a telecine machine or video source is tested sequentially by each successive channel of the DCP for correspondence with the predetermined criteria stored in that channel. If the pixel meets the criteria of a particular channel it is tagged for adjustment in accordance with the adjustment parameters defined in that channel. The adjustment parameters may include adjustment of one or more of the luminance, hue, saturation or position of the pixel. Thus, each of the channels will adjust the appearance of the pixel under test if it meets the adjustment criteria of that channel. The channels are designed such that each channel in turn can test the input video data stream at a sufficiently high speed that the DCP produces a corrected video data stream at broadcast rate.

There is, however, a trend in the television and video post-production industry to move away from the traditional 'clocked' processing of television images, whereby video frame rates are matched to the broadcast rate of 50 or 60 Hz, so that each television line is processed in exactly one 625th or 525th of the picture frame rate. Modern trends are to process images asynchronously, where data calculations take as long as necessary, provided that the average data processing rate matches the expected rates. Sometimes, it is not even necessary to match average real time or broadcast rates, as some processing in this 'computer' format is acceptable in non-real time.

Traditionally, video data has been stored on video tape and, in particular, digital video data has been stored on digital video tape. However, digital video tape can only be used to record data at real time rates. The advent of large capacity magnetic storage media such a hard disks has meant that video data can be stored and accessed at rates faster than real time. Video colour correctors on the other hand remain configured to process video data at real time rates.

SUMMARY OF THE INVENTION

Viewed from one aspect the present invention provides a method for the processing of video data in which the appearance characteristics of picture elements are modified using digital apparatus which provides a plurality of channels having respective processing means, each channel being adapted normally to operate to process a discrete range of characteristics, wherein the method comprises the step of operating the apparatus in an alternative mode in which at least two of the channels are used to carry out identical processing steps, spatial segments of the video data being split between said at least two channels to thereby increase the speed of processing.

Preferably the digital apparatus is a digital colour processing unit in which video data may be passed in sequence through selection means for each channel which determines whether pixels are to be modified in accordance with selection criteria for that channel, and wherein the digital colour processing unit is further provided with routing means for operating the unit in an alternative mode in which data is passed in parallel through at least two of the selection means, said at least two of the selection means having identical selection criteria and the associated channels modifying selected pixels in an identical way.

Viewed from another aspect the present invention provides a method of processing a stream of video data, wherein the data stream is split into a plurality of sequential portions and the portions are routed to a corresponding plurality of processing units each configured to perform an identical operation on the data.

Viewed from another aspect the present invention provides apparatus for the processing of a continuous stream of video data, the apparatus comprising a plurality of processing units for processing the video data and routing means for routing successive portions of the data stream respectively to at least two of the processing units, when said at least two processing units are configured to perform an identical processing operation on the video data.

In accordance with the present invention the video data stream may be processed faster than the individual capability of each processing unit as each processing unit will be operating on only a portion of the video data. The processing units will therefore operate on the video data in parallel when they are performing identical operations.

The number of portions into which the data stream is split will be determined in practice by reference to the number of available processing units and the number of separate simultaneous operations required. For example, in a system of six processing units, or channels, required to carry out only two modifications, the video data stream will be split into three successive portions and each portion will be routed through two processing units, each of the two processing units performing a respective modification.

Reconstituting means may also be provided for reconstructing the split portions of the data stream back into a single stream after processing.

The number of processing channels used may be altered dynamically. For example, an image may require only a simple correction for one part of the image, such as the adjustment of one colour, and this may be done using one processor only. Elsewhere in the image there may be a region where a complicated change is required, involving lots of separate colour adjustments. Additional processing channels may be called in and at least two channels used simultaneously to carry out the same steps. Subsequently these processors may be released.

Adopting computer processing techniques can lead to great productivity increases if intelligent routing is applied to the mapping of algorithms onto the available hardware in a system such as the Pandora DCP. Take as an example the processing of data of a film resolution image in a hardware system such as the DCP. With film resolution work there is no concept of real time, as there is in broadcast television, because the processing operations required are so computationally intensive. It is merely required to process images as cost effectively and efficiently as possible. As disclosed in U.S. Pat. No. 5,450,500, colour correction systems often have six or more dedicated channels for colour correction. Traditionally, it has been common to have each of these channels configured to process one sixth of the colour space or colour hue circle. The colour hue circle can be thought of as a continuous circular field of colours from red to yellow to green to cyan to blue to magenta and back to red. Thus the six conventional channels on a colour corrector are red, yellow, green, cyan, blue, and magenta. According to U.S. Pat. No. 5,450,500 these channels are, however, completely configurable by the operator. Thus, six different areas of the red hue, for example, can be identified, and processed accordingly.

According to the present invention if the operator wishes to make a change only to one red area, all six of the colour processing engines may be configured to process different spatial sixths of the image, to attain processing of the aforementioned film resolution data image in one sixth of the time that would be usual in a conventional synchronous colour processing system. Thus, the data stream corresponding to the image may be routed in six sequential portions to respective channels of the colour processor. Methods for splitting the image between colour processors are many. One possible method is to alternate between processors along the line direction of the image, feeding the first pixel on the line to the first processor, the second pixel to the second processor, and so on, such that successive channels receive successive pixels in a pattern that is repeated after the sixth pixel in the line. Another method is to split the lines between processors, such that all of the first line is processed by the first processor, all of the second line is processed by the second processor, and so on. Alternatives to these methods are many, and include, for example, the processing of the first sixth of the lines of a frame by the first processor, the second sixth by the second processor, and so on. Alternatively, each line may be split into six continuous portions, one portion being routed to each channel.

Similarly, if the operator wishes to make two alterations, to two separate colour regions in the picture, then three times the speed of processing can still be achieved than would have previously been possible. In this case, the six channels will be split into two equal groups each channel in a group performing an identical colour correction operation. Each group will receive all of the picture information in the video data stream, but each channel within the group will only receive one third of the pixels in the data stream for processing.

Other areas of processing to which this technique is applicable include the simple lookup techniques used to alter the gain, lift, and gamma. These functional units can run at many times the speed of the colour channel processor, which in turn can usually run at real time in a video configuration. Conventionally, in the video domain, there would be no point in running adjustments or processing at higher than real time video rate, but with the advent of film resolution data, it is useful to be able to process the data at the maximum rate possible.

Advantageously, some of the channels may be configured in software rather than the hardware configuration such as that of the DCP. Particularly advantageously a mixture of software and hardware channels may be used with the routing taking into account the relative capabilities of each channel. For example, to get maximum throughput of data in a configuration where four channels of colour processing are required, in a hardware/software system that has six channels available of hardware, it may be possible to run at 'double speed' with the hardware, processing colour channel one with hardware channels 1 and 2, colour channel two with hardware channels 3 and 4, colour channel three with hardware channels 5 and 6, whilst processing the fourth colour channel in software. There are many other ways in which a mixed environment of hardware and software processing elements can be matched into a 'load balanced' combination, by the use of intelligent routing.

One hardware implementation of the invention could use a plurality of "Pentium"™ or equivalent chips which can operate at speeds of 333 MHz or even more. Alternatively there could be used specialist processors such as the TMS 320C6X of Texas Instruments. This range includes both fixed and floating point chips. A third alternative is the "Network Share" range from Analog Devices in the United States. Alternatively, large field programmable gate array (FPGA) elements could be used, such as the 10K150 element from Altera in the United States.

BRIEF DESCRIPTION OF THE DRAWINGS

An embodiment of the invention will now be described with reference to the accompanying drawings in which.

DESCRIPTION OF PREFERRED EMBODIMENT

The digital colour processing apparatus is of the general type disclosed in U.S. Pat. No. 5,450,500, the contents of which are incorporated herein by reference.

Figure 1:
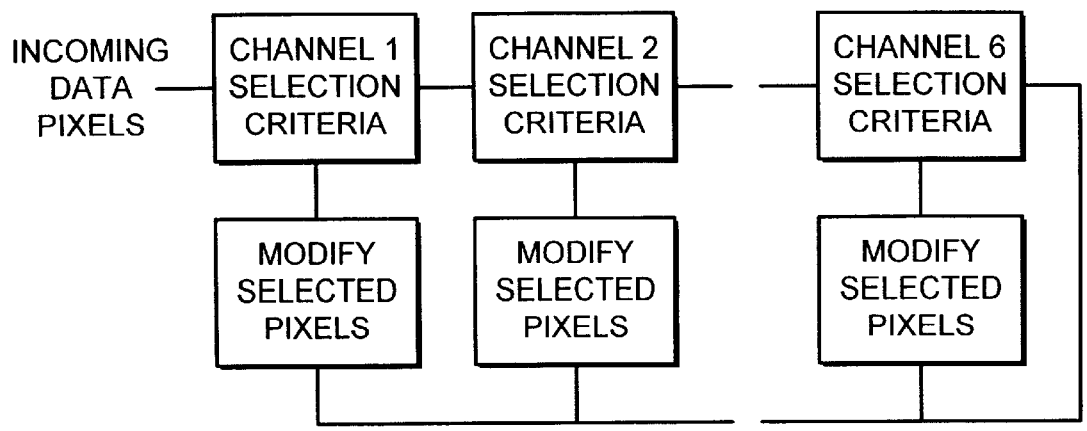
FIG. 1 is a diagrammatic view of digital colour processing apparatus operating in a conventional mode.

As can be seen in FIG. 1 a video signal is fed into processing means comprising a series of six channels, only three of which are illustrated, through which the pixels pass sequentially. Each channel is set up with its own selection criteria and its own modification criteria. Thus, in channel 1, all red pixels could be selected and the colour modified. In channel 2 all pixels satisfying a particular combination of colour properties and spatial coordinates could be selected and modified, and so on for all six channels. The modified pixels are then added back to the stream with pixels which have passed through without modification.

Figure 2:
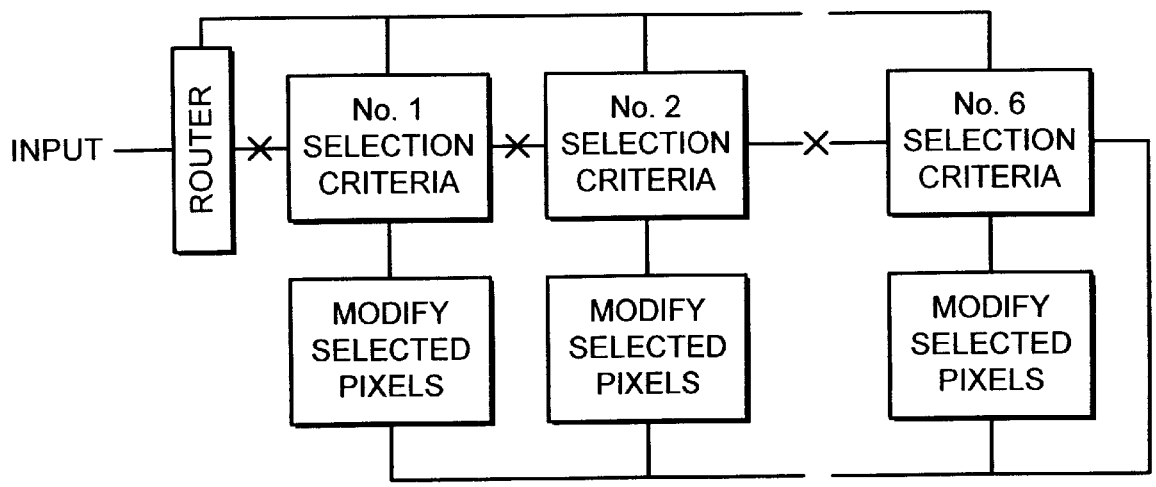
FIG. 2 is a diagrammatic view of the apparatus modified and operating in a different mode in accordance with the invention.

FIG. 2 shows the system modified in accordance with one embodiment of the present invention. In this arrangement a router is employed and this has disabled the normal sequential path, as denoted by "X". The router has instead been set up to feed the six channels in parallel. In this particular embodiment each of the six channels has been set up with the same selection criteria and the same modifications to be carried out. The router may supply successive pixels to the channels in sequence, or for example send an entire line of a video image through one channel, the next line through the next channel, and so forth until coming back to the first channel again.

It will be understood by those skilled in the art that the above exemplary embodiment does not limit the scope of the present invention. For example, six channels have been described, although of course a system comprising any number of channels would be improved by the invention. Furthermore, the invention has been described with particular reference to the Pandora DCP of the type illustrated in U.S. Pat. No. 5,450,500 although the invention is equally applicable to any similar image processing system providing that the routing of the signals through the channels can be configured as required.

What is claimed is:

1. A method for the processing of a stream of video data in which the appearance characteristics of picture elements are modified using digital apparatus which provides a plurality of channels having respective processing means, each channel being adapted normally to operate to process a discrete range of characteristics of the data stream by carrying out a respective different processing step, wherein the method comprises the steps of:

a) splitting the video data stream into at least two sequential spatial segments;

b) providing a first said sequential spatial segment of said video data stream to a first channel;

c) providing a second said sequential spatial segment of said video data stream to a second channel; and d) operating the apparatus in an alternative mode in which the first and second channels are used to carry out identical processing steps on the respective first and second spatial segments of the video data such that the first and second spatial segments of the video data are processed in parallel by said first and second channels to thereby increase the speed of processing, wherein the digital apparatus is a digital colour processing unit in which the video data may be passed in sequence through respective selection means associated with each respective channel, wherein each selection means determines whether pixels are to be modified in accordance with selection criteria for that channel, and wherein the digital colour processing unit is further provided with routing means, the method comprising the further step of:

operating the unit in an alternative mode in which the first and second sequential spatial segments of the video data are passed in parallel through at least two of the selection means, said at least two of the selection means having identical selection criteria and the associated channels modifying selected pixels in an identical way.

2. Apparatus in the form of a digital colour processing unit for the processing of a continuous stream of video data, the digital colour processing unit comprising:

a plurality of processing units for processing the video data;

routing means for routing successive portions of the data stream respectively to at least two of the processing units, when said at least two processing units are configured to perform an identical processing operation on the video data;

selection means associated with each processing unit through which video data may be passed in sequence, which determines whether pixels are to be modified in accordance with selection criteria for that processing unit; and routing means for operating the digital colour processing unit in an alternative mode in which data is passed in parallel through at least two of the selection means, said at least two of the selection means having identical selection criteria and the associated processing units modifying selected pixels in the identical way.

* * * * *